(12) United States Patent
Rosok (10) Patent No.: US 12,221,169 B2
(45) Date of Patent: Feb. 11, 2025

(54) FLOW GUIDING APPARATUS FOR A MOTOR VEHICLE

(71) Applicant: Magna Car Top Systems GmbH, Bietigheim-Bissingen (DE)

(72) Inventor: Urs-Patrick Rosok, Ludwigsburg (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 285 days.

(21) Appl. No.: 17/741,503

(22) Filed: May 11, 2022

(65) Prior Publication Data
US 2022/0371669 A1    Nov. 24, 2022

(30) Foreign Application Priority Data

May 18, 2021    (DE) .......................... 102021205050.6

(51) Int. Cl.
*B62D 35/00*    (2006.01)
(52) U.S. Cl.
CPC .................... *B62D 35/007* (2013.01)
(58) Field of Classification Search
CPC .......................................................... B62D 37/02
(Continued)

(56) References Cited

U.S. PATENT DOCUMENTS 5,141,281 A * 8/1992 Eger .................... B62D 35/007
296/180.5
5,923,245 A * 7/1999 Klatt .................... B60Q 1/2692
296/180.1
(Continued)

FOREIGN PATENT DOCUMENTS

DE    4207658 A1 *  9/1993 ........... B62D 35/007
DE    4207658 C2    7/1994
(Continued)

*Primary Examiner* — Amy R Weisberg
*Assistant Examiner* — Veronica M Shull
(74) *Attorney, Agent, or Firm* — Dickinson Wright PLLC (57) ABSTRACT

The invention relates to a flow guiding apparatus of a motor vehicle, comprising a spoiler which is fastened to a tailgate of the motor vehicle, and to an adjustment kinematics device for adjusting the spoiler between a rest position, in which the spoiler is arranged in a flush-mounted manner in the tailgate, and at least one functional position, in which the spoiler is deployed beyond the vehicle contour or the surface of the tailgate with regard to the height and/or the angle. In order to achieve a downforce effect and/or braking effect and/or aerodynamic improvement during driving of the motor vehicle, the adjustment of the adjustment kinematics device takes place via actuable drive means. This flow guiding apparatus is intended to be developed in such a way that a multiplicity of operating positions of the spoiler can be set with a compact overall design and integration into the movable tailgate, with at least one operating position intended to fulfil the function of an air brake. For this purpose, the adjustment kinematics arrangement comprises at least one adjustment kinematics unit which is formed from a first adjustment kinematics system and a second adjustment kinematics system which is coupled to the former in an operatively connected manner, the first adjustment kinematics system being configured as a four-bar linkage and to set a deployment height, and the second adjustment kinematics system being configured as a four-bar linkage and to set a deployment angle, and an adjustment of the spoiler being a superimposed kinematic adjustment movement of the first and second adjustment kinematics system, and the first adjustment kinematics system comprising at least one pivoting axle which is mounted in a stationary manner and is pivotal via an electric motor as drive means, and the second adjustment kinematics system comprising a (Continued)

pivoting axle which is mounted in a stationary manner and is pivotable via a separately actuable electric motor as drive means.

12 Claims, 6 Drawing Sheets

(58) Field of Classification Search
USPC ......... 296/181.5, 180.1, 180.2, 180.3, 180.5; 180/903, 68.1
See application file for complete search history.

(56) References Cited

U.S. PATENT DOCUMENTS

| | | | | |
|---|---|---|---|---|
| 7,481,482 B2* | 1/2009 | Grave | ................... | B62D 35/007 |
| | | | | 296/180.1 |
| 7,841,646 B2* | 11/2010 | Paul | ..................... | B62D 35/007 |
| | | | | 296/180.1 |
| 8,226,153 B2* | 7/2012 | Molnar | ................ | B62D 35/007 |
| | | | | 296/180.1 |
| 9,102,367 B1* | 8/2015 | Beierl | ..................... | B62D 37/02 |
| 9,132,868 B2* | 9/2015 | Shiga | ....................... | B62D 37/02 |
| 9,174,687 B2* | 11/2015 | Jeong | ................... | B62D 35/007 |
| 10,040,492 B2* | 8/2018 | Cha | ....................... | B62D 35/007 |
| 10,611,417 B2* | 4/2020 | Kim | ..................... | B62D 35/007 |

FOREIGN PATENT DOCUMENTS

| | | |
|---|---|---|
| DE | 20001695 U1 | 5/2000 |
| DE | 10309369 A1 | 9/2004 |
| DE | 102013106400 A1 | 12/2014 |
| DE | 102020121746 A1 | 3/2021 |
| WO | WO-2008110135 A1 * | 9/2008 ........... B62D 35/007 |

* cited by examiner

FLOW GUIDING APPARATUS FOR A MOTOR VEHICLE

CROSS-REFERENCE TO RELATED APPLICATIONS

This application claims priority to German Application No. DE 102021205050.6 filed May 18, 2021. The entire disclosure of the above application is incorporated herein by reference.

FIELD OF THE INVENTION

Flow guiding apparatuses of this type are known in a multiplicity of embodiments and are generally also called "spoilers". For example, a flow guiding apparatus of this type is known from DE 103 09 369 A1. It comprises a spoiler which is arranged on the rear region of a motor vehicle and can be adjusted by means of a deployment mechanism between a rest position, in which it lies substantially within the vehicle contour, and an operating position, in which it protrudes beyond the vehicle contour. The adjustment mechanism is configured in such a way that translational and rotational components are superimposed during the deployment movement of the spoiler, with the result that, in the operating position, the spoiler advantageously assumes a position which is spaced apart from the vehicle contour. This known adjustment mechanism permits only a very small deployment angle of the spoiler (with regard to its rest position), however.

BACKGROUND OF THE INVENTION

This section provides information related to the present disclosure which is not necessarily prior art.

Document DE 10 2020 121 746 A1 discloses a known embodiment of a flow guiding apparatus with a drive device. The drive device has a drive motor and at least one link arrangement.

As is known, for example, the aerodynamic properties of a motor vehicle and therefore the driving behaviour can be influenced positively by way of a spoiler of this type. In particular, at relatively high speeds, the road grip of the vehicle can be increased by way of a downforce effect of the spoiler.

Furthermore, DE 200 01 695 U1 has disclosed a rear spoiler which, coupled to the brake system of the automobile for example, can be moved into a position of high air resistance, in order to act as an "air brake", with the result that the effect of conventional brakes is boosted. The deployment movement of the spoiler is provided as simple pivoting about a pivoting shaft which extends in the vehicle transverse direction. Here, the coupling of the spoiler to the brake system can be realised by way of a hydraulic circuit.

DE 10 2013 106 400 A1 has disclosed a rear spoiler for a motor vehicle, which rear spoiler has a spoiler body for deflecting an air stream for the provision of an aerodynamic effect and an adjustment kinematics system for moving the spoiler body between a parked position and a use position. The spoiler body is of split configuration and comprises a main spoiler and an auxiliary spoiler which can be moved relative to the main spoiler with the aid of the adjustment kinematics system.

Furthermore, DE 42 07 658 C2 has disclosed a flow guiding apparatus for the rear region of a motor vehicle, in the case of which an air guiding profile which can be extended from a rest position in the vehicle rear can be changed by way of adjustment of the angle of attack in the active position. A change in that cross-sectional area of the air guiding profile which is relevant to air resistance is achieved here by way of an adjustment arrangement which comprises a kinematic summing gear mechanism. This kinematic summing gear mechanism permits both an extension of the air guiding profile out of its starting position in the rear of the motor vehicle and an adjustment of the angle of attack of the entire air guiding profile in its active position.

It is a disadvantage of this known flow guiding apparatus that the extension height is greatly limited and the spoiler or the air guiding profile tends to reach its deployed position behind the rear region of the motor vehicle as viewed in the travelling direction. Furthermore, only limited positions can be achieved by way of this solution.

Against this background, the present invention is concerned with the object of developing a flow guiding apparatus for the rear region of a motor vehicle in such a way that a multiplicity of operating positions of the spoiler can be set with a compact overall design and integration into the movable boot lid; at least one operating position is intended to fulfil the function of an air brake.

SUMMARY OF THE INVENTION

This section provides a general summary of the disclosure, and is not a comprehensive disclosure of its full scope or all of its features.

The present invention achieves this object by way of a flow guiding apparatus for a motor vehicle, comprising a spoiler which is fastened to a tailgate of the motor vehicle, and an adjustment kinematics device for adjusting the spoiler between a rest position, in which the spoiler is arranged in a flush-mounted manner in the tailgate, and at least one functional position, in which the spoiler is deployed beyond the vehicle contour or the surface of the tailgate with regard to the height and/or the angle, in order to achieve a downforce effect and/or braking effect and/or aerodynamic improvement during driving of the motor vehicle, the adjustment of the adjustment kinematics device taking place via actuable drive means, and the adjustment kinematics arrangement comprising at least one adjustment kinematics unit which is formed from a first adjustment kinematics system and a second adjustment kinematics system which is coupled to the former in an operatively connected manner, the first adjustment kinematics system being configured as a four-bar linkage and to set a deployment height, and the second adjustment kinematics system being configured as a four-bar linkage and to set a deployment angle, and an adjustment of the spoiler being a superimposed kinematic adjustment movement of the first and second adjustment kinematics system, and the first adjustment kinematics system being pivotable via an electric motor as drive means, and the first adjustment kinematics system comprising at least one pivoting axle which is mounted in a stationary manner, and the second adjustment kinematics system being pivotable via a separately actuable electric motor as drive means, and the second adjustment kinematics system comprising a pivoting axle which is mounted in a stationary manner, characterized in that the pivoting axle which is mounted in a stationary manner is pivotable via the electric motor, and in that the pivoting axle which is mounted in a stationary manner is pivotable via the electric motor, and in that the second adjustment kinematics system has a double crank with a first double crank link with a first end region and a second end region and a second double crank link with a first end region and a second end region and a drop arm element with a first end region and an attachment region, the first double crank link being attached via its second end region such that it can be moved pivotably about a pivoting axle on the first end region of the second double crank link, and being mounted via its first end region via a pivoting bearing of bearing-fixed configuration such that it can be moved pivotably about the pivoting axle which is attached directly or by means of a bearing component on the tailgate, and the second double crank link being mounted via its second end region such that it can be moved pivotably about a pivoting axle on the first end region of the drop arm element, and being coupled in an operatively connected manner via its attachment region to the second end region of the coupling link such that it can be moved pivotably about a pivoting axle, and the drop arm element being attached fixedly via its attachment region on the lower side of the spoiler.

The achievement of the multiplicity of operating positions of the spoiler is achieved by way of the adjustment kinematics system which comprises two four-bar linkage arrangements. Here, the first four-bar linkage arrangement can be actuated in order to set the deployment height, and the second four-bar linkage arrangement is responsible for setting the tilt which is called the angle of attack in the following text. The first and second four-bar linkage arrangement are adjusted in each case by way of a control arrangement independently of one another into the associated position of the desired operating position.

By way of the embodiment according to the invention of the second adjustment kinematics system which comprises a double crank with a first and a second double crank link, furthermore, an overextended operating position between the first and the second double crank link with an angle above 180 degrees can be adjusted, as a result of which a minimization of force and positional securing, in particular for the braking position, is achieved.

The adjustment kinematics device 20 is designed in such a way that the spoiler pivot point is situated on the coupling link of the first adjustment kinematics system starting from the rest position as far as into the fifth position. This first adjustment kinematics system is configured as a four-bar linkage, as has already been explained, with the result that any desired intermediate positions are possible. The trajectory can be adapted correspondingly by way of the design of the four-bar linkage, which makes a high variability in the aerodynamic settings of the spoiler possible.

The angular setting of the spoiler can be achieved via a double crank arranged fixedly in a bearing. As a result, the complexity and the costs of the angular setting are reduced.

The adjustment of the first and second four-bar linkage arrangement takes place here via electric motors which can be actuated independently of one another. For this purpose, both the first and the second four-bar linkage arrangement are assigned in each case one electric motor.

The electric motors are advantageously of self-locking configuration. As an alternative, the electric motors can be equipped with an additional brake unit. As a result, no mechanical stop is required in the case of the embodiment of the flow guiding apparatus.

The current angular position of the electric motors is detected via Hall sensors. Subsequently, the detected angular position is transmitted to a control unit, and is compared there with stored set point positions of the angle and is tracked via the electric motors in a manner which is dependent on the actual/setpoint comparison.

The compact overall design is advantageously achieved by way of the integration of the flow guiding apparatus into the tailgate of the motor vehicle.

The axes which are mentioned in the following text correspond to the axes of a vehicle coordinate system. Accordingly, the X-axis corresponds to the longitudinal direction of the motor vehicle, the Y-axis corresponds to the transverse direction, and the Z-axis corresponds to the vertical direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
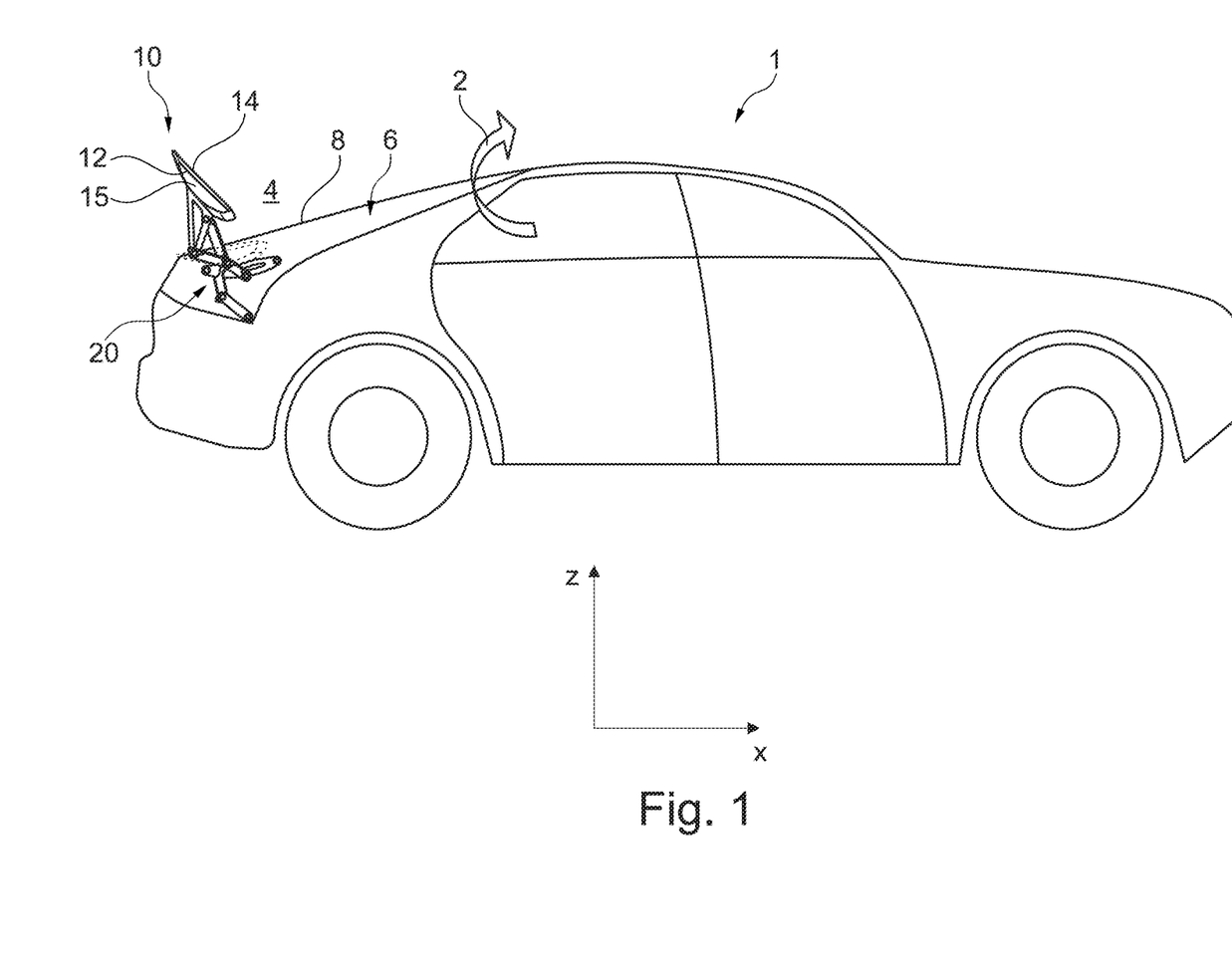
FIG. 1 shows a diagrammatic side view of a motor vehicle with a flow guiding apparatus which is integrated into the tailgate in a position, in which the flow guiding apparatus is in a maximum deployed functional position.

FIG. 1 shows a diagrammatic side view of a motor vehicle 1 with a flow guiding apparatus 10 which is provided in the rear region 4. In the rear region 4, the motor vehicle 1 has a tailgate 6 which can be pivoted into a loading position about a transverse axis and has an outwardly pointing vehicle surface 8. The pivoting capability of the tailgate 6 is shown by way of the arrow 2.

The flow guiding apparatus 10 is arranged in a manner which is integrated into the tailgate 6, and comprises a wing-like spoiler 12 which is configured as an air guiding profile and extends virtually over the entire tailgate 6 in the transverse direction. Furthermore, the flow guiding apparatus 10 comprises an adjustment kinematics device 20 and actuable drive means which are configured as electric motors 60, 61.

In the case of pivoting of the tailgate 6 into the loading position, the flow guiding apparatus 10 pivots with the tailgate 6.

The flow guiding apparatus 10 can fundamentally be deployed by means of the adjustment kinematics device 20, starting from the rest position which is lowered in the vehicle contour/tailgate, into a completely extended functional position. In the lowered rest position, the outwardly pointing upper side 14 of the wing-like spoiler 12 is flush with respect to the vehicle contour of the vehicle surface 8 of the tailgate 6. The spoiler 12 has a lower side 15 which lies opposite the upper side 14.

FIG. 1 shows the flow guiding apparatus 10 in a maximum extended functional position, in which the wing-like spoiler 12 is situated in a pivoted position which is raised above the vehicle contour. A braking effect is achieved in this functional position.

It goes without saying that any desired intermediate position of the spoiler 12 can also be set.

The deployment movement of the spoiler 12 out of its rest position (shown in FIG. 2) into the functional positions (shown in FIG. 4-8) is a movement which is composed of a translation and a rotation.

As can be seen from the perspective illustrations of FIG. 3*a*-3*d*, the adjustment kinematics device 20 which is used to adjust the spoiler 12 between the rest position and the functional positions has two adjustment kinematics units 20*a* and 20*b* which are arranged spaced apart from one another in the vehicle transverse direction. In the exemplary embodiment which is shown, the adjustment kinematics units 20*a* and 20*b* are of mirror-symmetrical configuration. Only one vertical kinematics unit will therefore be described in the following text.

FIG. 2 and FIG. 4 to FIG. 8 show the side view of the adjustment kinematics unit 20*a* of the driver's side of the motor vehicle 1. The function and the individual parts will be described on the basis of the adjustment kinematics unit 20*a*.

The adjustment kinematics unit 20*a* consists of a first and second adjustment kinematics system 24, 26 which are coupled to one another in an operatively connected manner as will be described in greater detail in the following text.

The first adjustment kinematics system 24 is configured as a four-bar linkage arrangement (S1, S2, S3, S4) and brings about the setting of the height in the Z-direction of the spoiler 12 in the case of a corresponding actuation and adjustment.

The second adjustment kinematics system 26 is configured as a four-bar linkage arrangement (S5, S6, S7, S8) which comprises a double crank, and brings about the setting of the angle of the spoiler 12 in the case of a corresponding actuation and adjustment. Here, an angle α=0 degrees is assumed on the rest position. In the maximum deployed functional position (shown in FIG. 8), the angle α corresponds to approximately 55 degrees. The deployment height is approximately 150 mm. In this functional position, a braking function is achieved by means of the spoiler 12.

Here, the first adjustment kinematics system 24 comprises:
a first pivoting link 30 with a first end region 30*a* and a second end region 30*b*,
a coupling link 32 which is of bent-over configuration in a middle region, with a first end region 32*a*, a second end region 32*b* and an attachment region 32*c* which is configured in the middle region,
a second pivoting link 34 with a first end region 34*a* and a second end region 34*b*.

The first pivoting link 30 is mounted on its first end region 30*a* via a bearing-fixed arranged pivoting bearing 40 such that it can be moved pivotably about a pivoting axle S1. Here, the pivoting bearing 40 is attached directly or by means of a bearing component on the tailgate 6. Via its second end region 30*b*, the first pivoting link 30 is attached on the first end region 32*a* of the coupling link 32 such that it can be moved pivotably about a pivoting axle S2. The second pivoting link 34 is mounted via its first end region 34*a* via a bearing-fixed arranged pivoting bearing 42 such that it can be moved pivotably about a pivoting axle S3. Here, the pivoting bearing 42 is attached directly or by means of a bearing component on the tailgate 6. Via its second end region 34*b*, the second pivoting link 34 is attached on the attachment region 32*c* of the coupling link 32 such that it can be moved pivotably about a pivoting axle S4.

Here, the second adjustment kinematics system 26 comprises:
a double crank 50 with a first double crank link 52 with a first end region 52*a* and a second end region 52*b* and a second double crank link 54 with a first end region 54*a* and a second end region 54*b*,
a drop arm element 56 with a first end region 56*a* and an attachment region 56*b*.

The double crank 50 is formed by way of the first double crank link 52 and a second double crank link 54; for this purpose, the first double crank link 52 is attached via its second end region 52*b* on the first end region 54*a* of the second double crank link 54 such that it can be moved pivotably about a pivoting axle S5.

Via its first end region 52*a*, the first double crank link 52 is mounted via a pivoting bearing 58 of bearing-fixed configuration in such a way that it can be moved pivotably about a pivoting axle S6. The pivoting bearing 58 is attached directly or by means of a bearing component on the tailgate 6.

The second double crank link 54 is mounted via its second end region 54*b* on the first end region 56*a* of the drop arm element 56 such that it can be moved pivotably about a pivoting axle S7. Via its attachment region 56*b*, the drop arm element 56 is coupled to the second end region 32*b* of the coupling link 32 such that it can be moved pivotably about a pivoting axle S8. Furthermore, the drop arm element 56 is attached fixedly via its attachment region 56*b* on the lower side 15 of the spoiler.

All the above-described pivoting axles S1-S8 are oriented in a vehicle transverse direction and parallel to one another.

The above-described embodiment of the adjustment kinematics device 20 is designed in such a way that the spoiler pivot point is situated on the coupling link 32 of the first adjustment kinematics system 24, starting from the rest position as far as into the fifth functional position. This first adjustment kinematics system 24 is configured as a four-bar linkage, as has already been explained, with the result that any desired intermediate positions are possible. The trajectory can be adapted correspondingly by way of the design of the four-bar linkage.

An adjustment movement of the adjustment kinematics device 20 starting from the rest position (shown in FIG. 2) into the functional positions (shown in FIG. 4-8) is achieved via actuable drive means.

Figure 8:
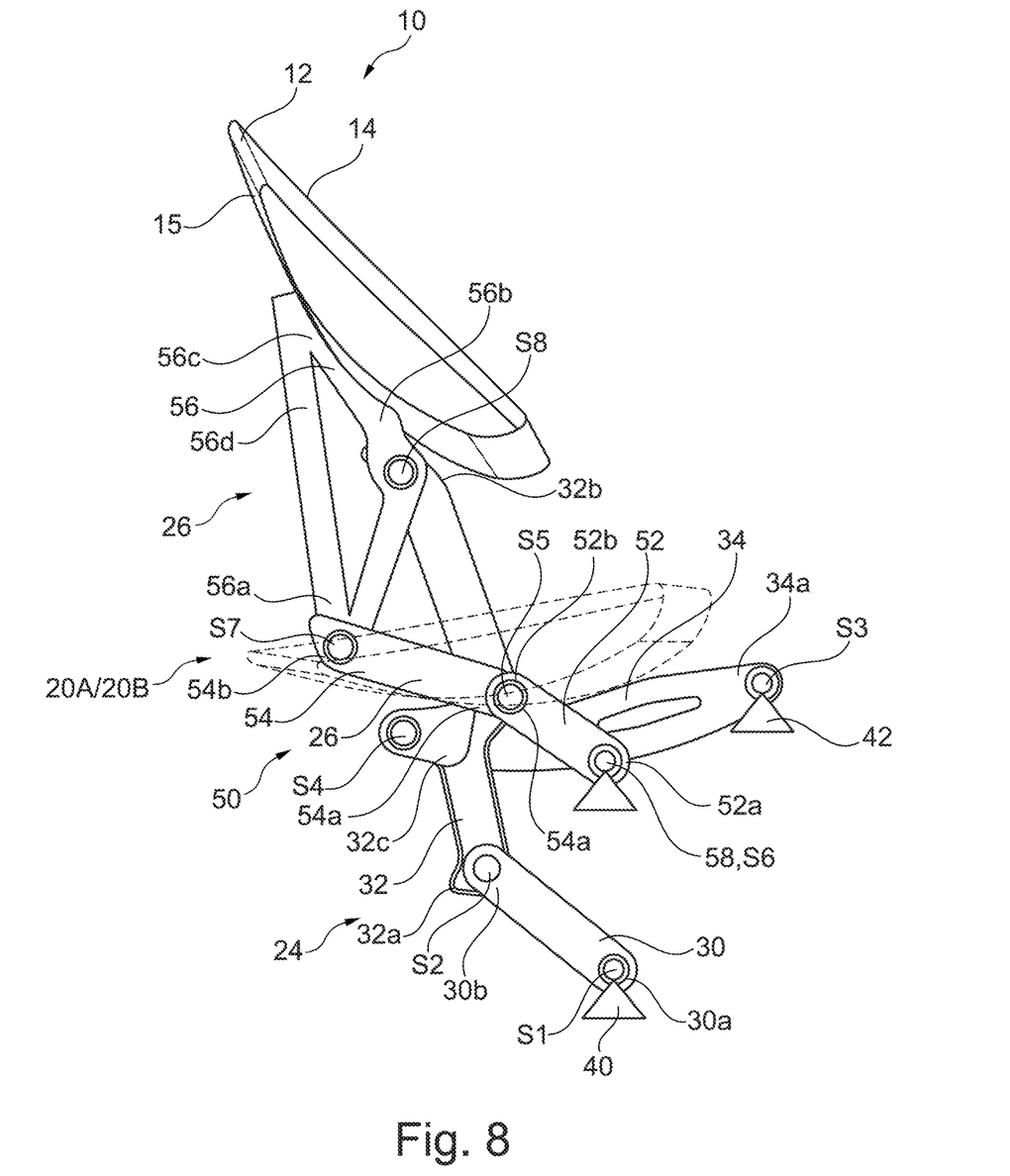
FIG. 8 shows a diagrammatic side view of the flow guiding apparatus in a fifth functional position which corresponds to a maximum extended functional position of the spoiler.

The actuable drive means are configured as electric motors 60-61. Here, each adjustment kinematics unit 20*a* and 20*b* is assigned in each case an electric motor 60 and 61. This means that the adjustment kinematics device 20 comprises a total of four electric motors 60/61. As can be seen from the perspective illustrations of FIG. 2*a*-2*d*, the output shafts of the electric motors 60 are attached in each case fixedly for conjoint rotation on the associated pivoting axles S1 of the first adjustment kinematics system 24, and the output shafts of the electric motors 61 are attached in each case fixedly for conjoint rotation on the associated pivoting axle S6 of the second adjustment kinematics system 26. The electric motors 60/61 in each case comprise separate electric supply and control lines 64. An illustration of the associated control unit is dispensed with for the sake of simplicity. Furthermore, the electric motors 60/61 are of self-locking configuration. As an alternative, the electric motors 60/61 can be configured with an additional brake unit. As a result, a mechanical end stop in the completely extended functional position which is shown in FIG. 8 can be dispensed with.

Figure 2:
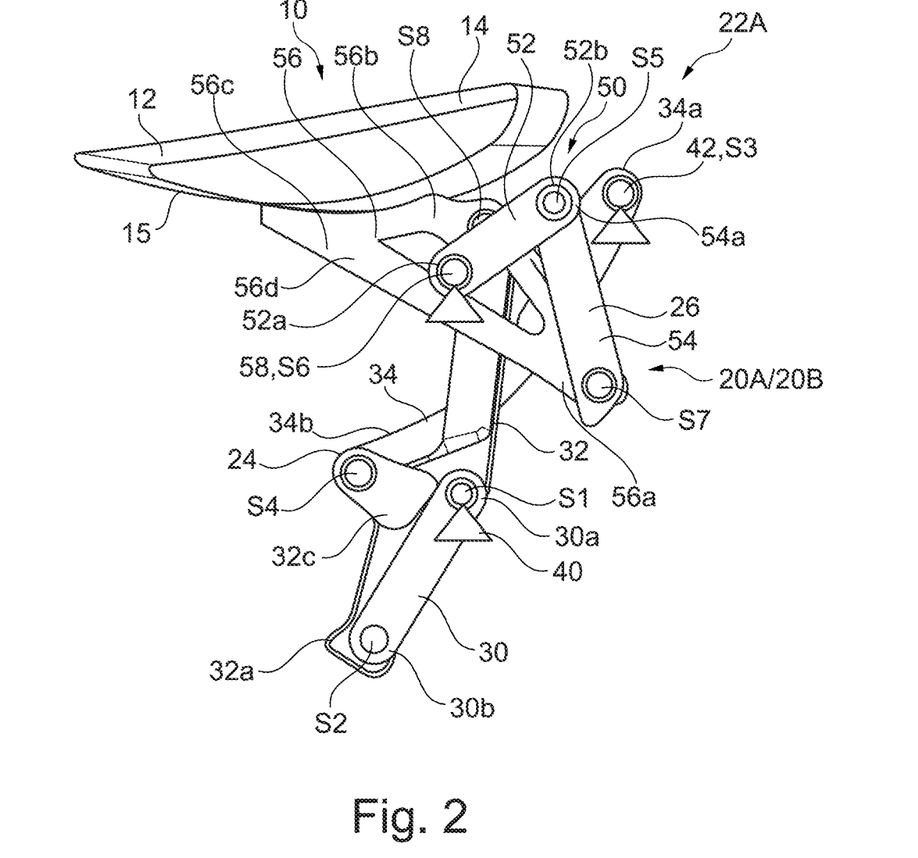
FIG. 2 shows a diagrammatic side view of the flow guiding apparatus in the rest position.
Figure 3A:
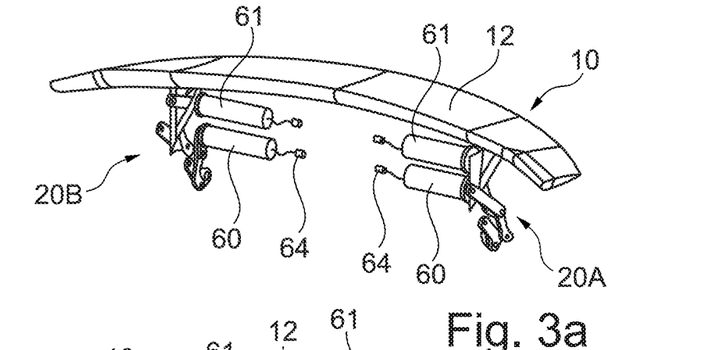
FIG. 3a-d show the flow guiding apparatus in the rest position in different perspective views.
Figure 3B:
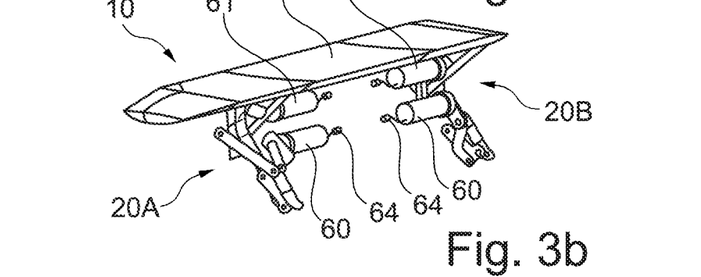
Figure 3C:
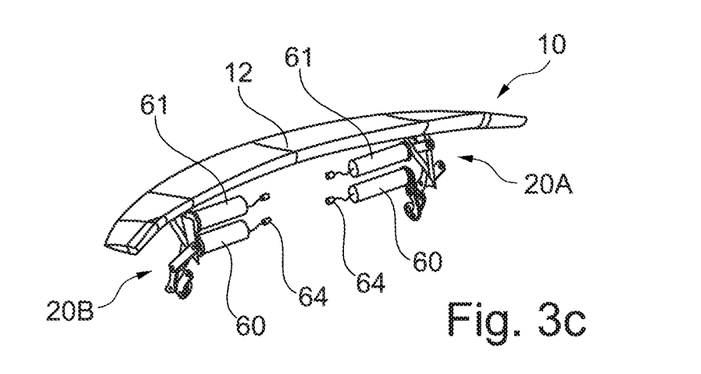
Figure 3D:
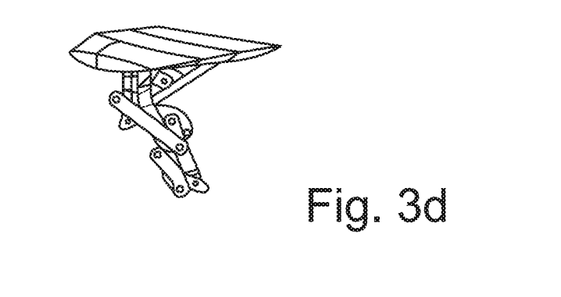

FIG. 2 illustrates the rest position of the spoiler 12 which, in this state, is received in a recess of the tailgate 6. The spoiler 12 is connected on its lower side 15 to a base element 56c of the drop arm element 56, for example a carrier body which is fastened to the lower side of the spoiler 12. Furthermore, a reinforcing brace 56d is arranged on the base element 56c, which reinforcing brace 56d is supported on the first end region 56a of the drop arm element 56. In this rest position, the deployment angle is 0 degrees and the deployment height is 0 mm.

Figure 4:
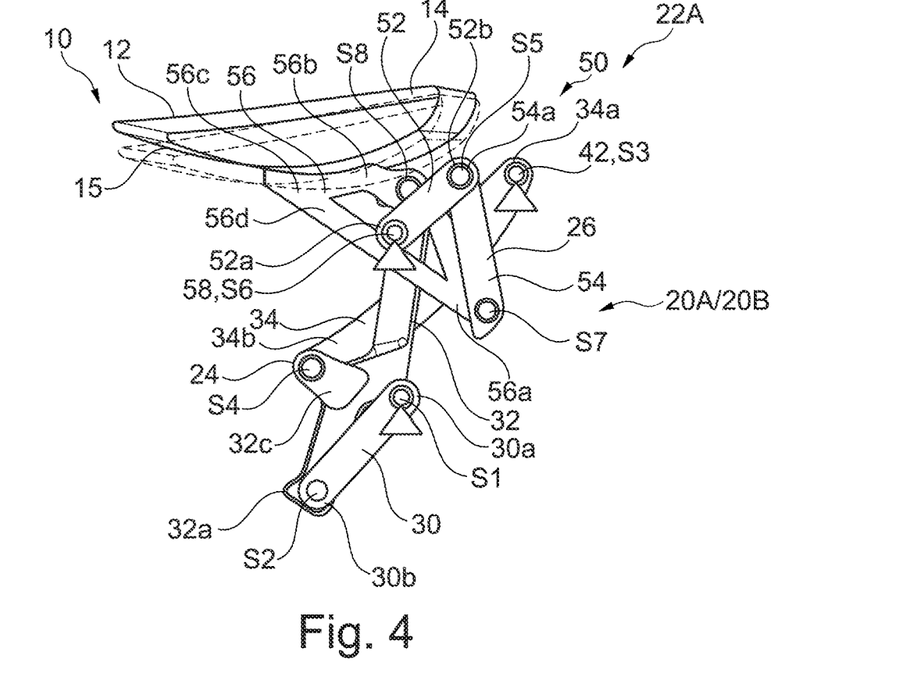
FIG. 4 shows a diagrammatic side view of the flow guiding apparatus in a first functional position.

FIG. 4 illustrates the first functional position, into which the spoiler 12 has been deployed somewhat beyond the vehicle contour or the surface of the tailgate 6 by means of the adjustment kinematics device 20, in order to provide a downforce effect in a manner known per se during driving, or in order to improve the aerodynamics of the motor vehicle 1 in another way (noise, wind resistance, . . . ) and to adapt them to the operating state. This first functional position is therefore also called the "first downforce position" in the following text. In the first downforce position, the deployment height of the spoiler is approximately 10 mm and the deployment angle of the spoiler 12 (with regard to the rest position) is approximately 3 degrees.

Figure 5:
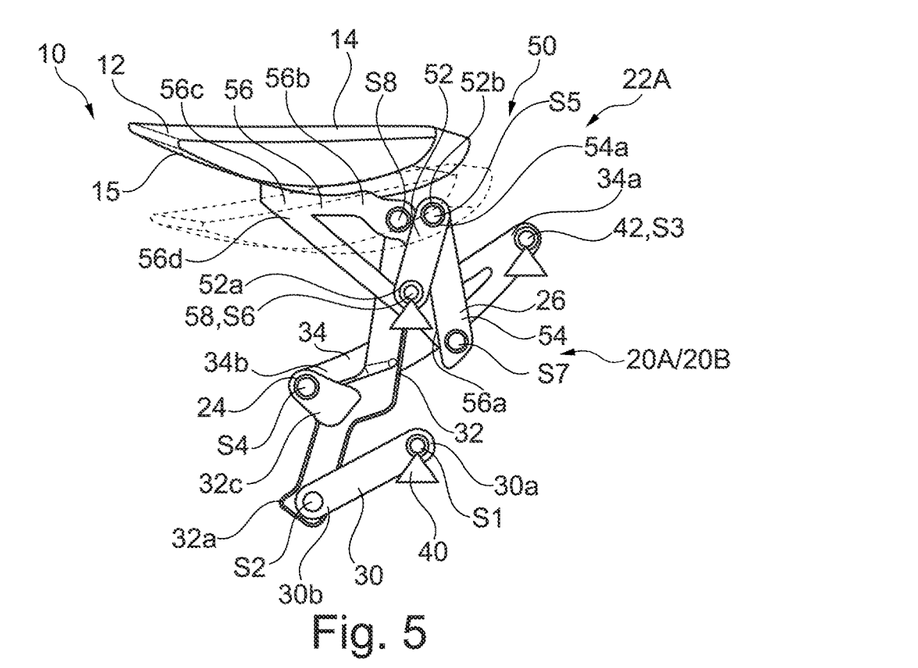
FIG. 5 shows a diagrammatic side view of the flow guiding apparatus in a second functional position.

FIG. 5 illustrates the second functional position, into which the spoiler 12 has been deployed further with regard to the height beyond the vehicle contour or the surface of the tailgate 6 by means of the adjustment kinematics device 20, in order to provide a downforce effect in a manner known per se during driving, by way of which downforce effect the road grip of the vehicle 1 is improved. This second functional position is therefore also called the "second downforce position" in the following text. In the second downforce position, the deployment height of the spoiler 12 is approximately 40 mm and the deployment angle of the spoiler 12 (with regard to the rest position) is approximately 10 degrees.

Figure 6:
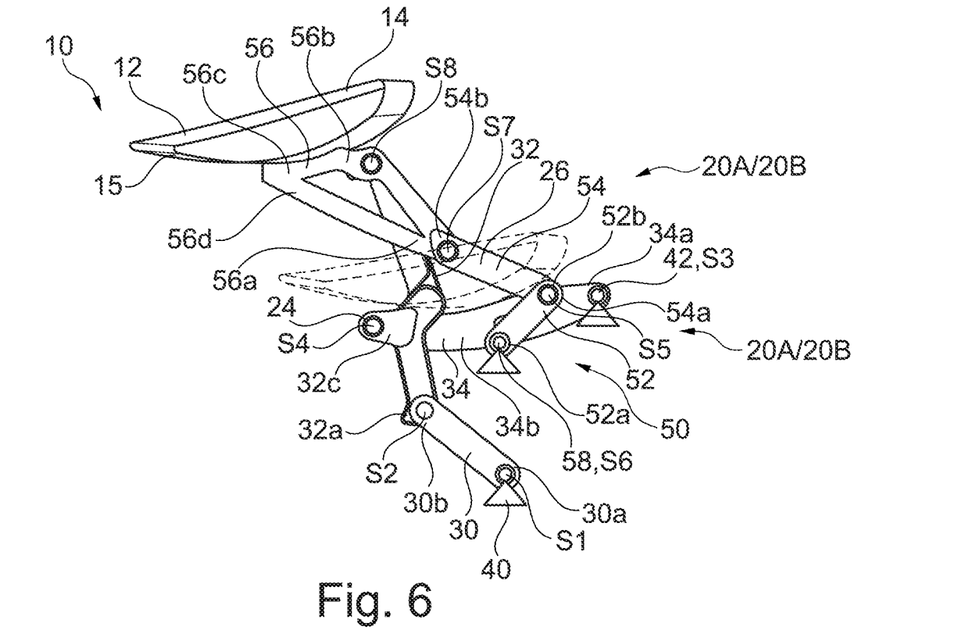
FIG. 6 shows a diagrammatic side view of the flow guiding apparatus in a third functioning position.

FIG. 6 illustrates the third functional position, into which the spoiler 12 has been deployed and tilted even further with regard to the height beyond the vehicle contour or the surface of the tailgate 6 by means of the adjustment kinematics device 20, in order to provide a downforce effect in a manner known per se during driving, by way of which downforce effect the road grip of the vehicle 1 is improved even further. This third functional position is therefore also called the "third downforce position" in the following text. In the third downforce position, the deployment height of the spoiler 12 is approximately 150 mm and the deployment angle of the spoiler 12 (with regard to the rest position) is approximately −5 degrees.

In the case of a predefined driving speed which is substantially higher than the abovementioned driving speed being exceeded, the spoiler can be adjusted further into the fourth functional position (shown in FIG. 7) and starting from the fourth functional position into the fifth functional position (shown in FIG. 8) via the adjustment kinematics device 20. In these functional positions (shown in FIG. 8), the spoiler 12 is deployed further and turned further beyond the positions which are shown in FIG. 4-7, in order to provide a braking effect during driving.

Figure 7:
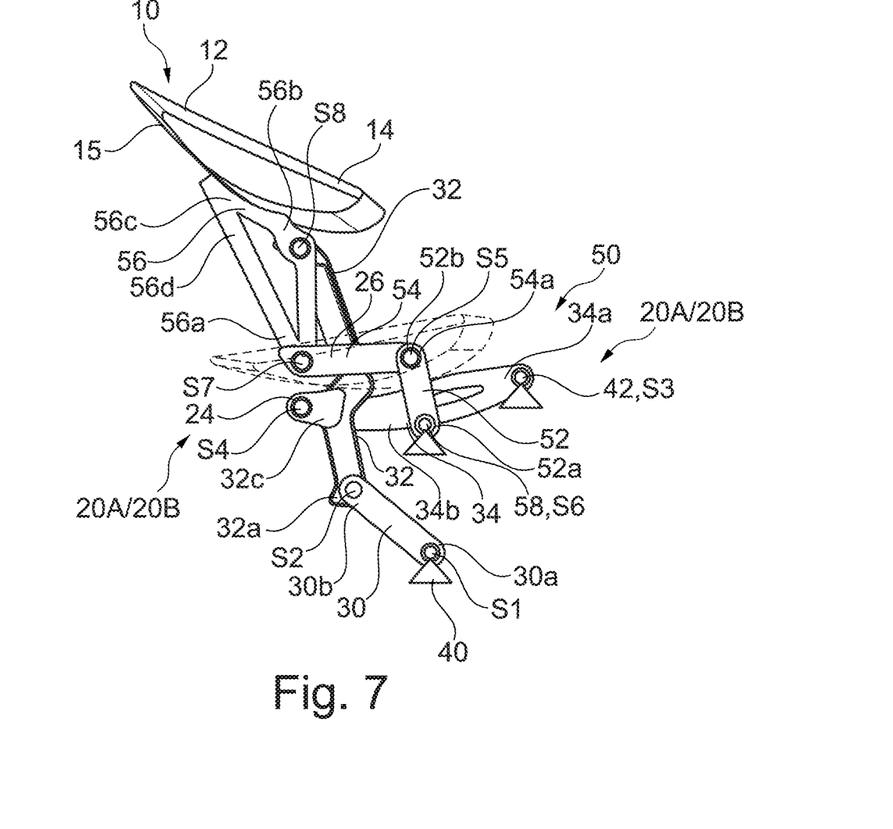
FIG. 7 shows a diagrammatic side view of the flow guiding apparatus in a fourth functional position.

In the fourth functional position which is shown in FIG. 7, the deployment height is approximately 150 mm and the deployment angle of the spoiler 12 (with regard to the rest position) is approximately 35 degrees.

In the fifth functional position which is shown in FIG. 8, the deployment height is approximately 150 mm and the deployment angle of the spoiler 12 (with regard to the rest position) is approximately 55 degrees.

What is claimed is:

1. A flow guiding apparatus of a motor vehicle, comprising a spoiler which is fastened to a tailgate of the motor vehicle, and an adjustment kinematics device for adjusting the spoiler between a rest position, in which the spoiler is arranged in a flush-mounted manner in the tailgate, and at least one functional position, in which the spoiler is deployed beyond a vehicle contour or a surface of the tailgate with regard to a height and/or an angle, in order to achieve a downforce effect and/or braking effect and/or aerodynamic improvement during driving of the motor vehicle, an adjustment of the adjustment kinematics device taking place via actuatable drive means, and the adjustment kinematics device comprising at least one adjustment kinematics unit which is formed from a first adjustment kinematics system and a second adjustment kinematics system which is coupled to the first adjustment kinematics system in an operatively connected manner, the first adjustment kinematics system being configured as a four-bar linkage and to set a deployment height, and the second adjustment kinematics system being configured as a four-bar linkage and to set a deployment angle, and an adjustment of the spoiler being a superimposed kinematic adjustment movement of the first and second adjustment kinematics systems, and the first adjustment kinematics system being pivotable via a first electric motor as drive means, and the first adjustment kinematics system comprising at least one first adjustment pivoting axle which is mounted in a stationary manner, and the second adjustment kinematics system being pivotable via a separately actuatable second electric motor as drive means, and the second adjustment kinematics system comprising a second adjustment pivoting axle which is mounted in a stationary manner, characterized in that the second adjustment pivoting axle which is mounted in a stationary manner is pivotable via the second electric motor, and in that the second adjustment kinematics system has a double crank with a first double crank link with a first end region and a second end region and a second double crank link with a first end region and a second end region and a drop arm element with a first end region and an attachment region, the first double crank link being attached via its second end region such that it can be moved pivotably about a first double crank second end region pivoting axle on the first end region of the second double crank link, and being mounted via its first end region via a first pivoting bearing of bearing-fixed configuration such that it can be moved pivotably about a first double crank first end region pivoting axle which is attached directly or by means of a bearing component on the tailgate, and the second double crank link being mounted via its second end region such that it can be moved pivotably about a second double crank second end region pivoting axle on the first end region of the drop arm element, and the drop arm element being coupled in an operatively connected manner via its attachment region to a second end region of a coupling link such that the drop arm element can be moved pivotably about a drop arm pivoting axle, and the drop arm element being attached fixedly via its attachment region on a lower side of the spoiler.

2. The flow guiding apparatus according to claim 1, wherein the adjustment kinematics arrangement comprises two adjustment kinematics units which are arranged spaced apart from one another in the vehicle transverse direction and are of mirror-symmetrical construction.

3. The flow guiding apparatus according to claim 1, wherein the first adjustment kinematics system has a first pivoting link with a first end region and a second end region, the coupling link with a first end region, the second end region and an attachment region which is configured in the middle region, and a second pivoting link with a first end region and a second end region, the first pivoting link being mounted on its first end region via a first pivoting bearing such that it can be moved pivotably about a first pivoting link first pivoting axle, the first pivoting bearing being attached directly or by means of a bearing component on the tailgate, and being attached via its second end region such that it can be moved pivotably about a first pivoting link second pivoting axle on the first end region of the coupling link, and the second pivoting link being mounted via its first end region via a second pivoting bearing, which is arranged in a positionally fixed manner, such that it can be moved pivotably about a second pivoting link first pivoting axle, the second pivoting bearing being attached directly or by means of a bearing component on the tailgate, and the second pivoting link being attached via its second end region such that it can be moved pivotably about a second pivoting link second pivoting axle on the attachment region of the coupling link.

4. The flow guiding apparatus according to claim 1, wherein the electric motors are of self-locking configuration.

5. The flow guiding apparatus according to claim 1, wherein the electric motors are configured with a separate brake unit.

6. The flow guiding apparatus according to claim 1, wherein a spoiler pivot point is situated on the coupling link of the first adjustment kinematics system in the case of the adjustment movement starting from the rest position as far as into one of the possible functional positions.

7. A flow guiding apparatus of a motor vehicle, comprising a spoiler connected to a tailgate of the motor vehicle via an adjustment kinematics device configured for adjusting the spoiler between a rest position, in which the spoiler is arranged in a flush-mounted manner relative to a vehicle contour or a surface of the tailgate, and at least one functional position, in which the spoiler is deployed beyond the vehicle contour or the surface of the tailgate with regard to a height and/or an angle, in order to achieve a downforce effect and/or a braking effect and/or an aerodynamic improvement during driving of the motor vehicle, and a drive means for actuating the adjustment kinematics device to cause movement of the spoiler between its rest and at least one functional positions, wherein the adjustment kinematics device includes a first adjustment kinematics system operatively interconnected to a second adjustment kinematics system, wherein the first adjustment kinematics system is configured as a first four-bar linkage operable to set a deployment height for the spoiler and the second adjustment kinematics system is configured as a second four-bar linkage operable to set a deployment angle of the spoiler, wherein setting of the deployment height and/or deployment angle of the spoiler results from a superimposed kinematic adjustment movement of the first and second adjustment kinematics systems, wherein the first adjustment kinematics system is pivotable via actuation of a first electric motor of the drive means and the second adjustment kinematics system is pivotable via independent actuation of a second electric motor of the drive means, wherein the first adjustment kinematics system includes a first pivoting bearing operably mounted to the tailgate, which supports a first pivoting axle that is pivotable via the first electric motor, wherein the second adjustment kinematics system includes a double crank having a first double crank link with a first end region and a second end region, a second double crank link having a first end region and a second end region, and a drop arm element with a first end region and an attachment region, wherein the first double crank link is attached via its second end region for pivotal movement relative to the first end region of the second double crank link, wherein the first end region of the first double crank link is pivotably supported by a second pivoting axle of a second pivoting bearing that is operably mounted to the tailgate, wherein the second pivoting axle is pivotable via the second electric motor of the drive means, wherein the second double crank link is mounted via its second end region for pivotable movement relative to the first end region of the drop arm element.

8. The flow guiding apparatus according to claim 7, wherein the first adjustment kinematics system has a first pivoting link with a first end region and a second end region, a coupling link with a first end region, a second end region and an intermediate attachment region, and a second pivoting link with a first end region and a second end region, the first pivoting link being mounted on its first end region via the first pivoting bearing such that it can be moved pivotably about the first pivoting axle, the first pivoting link being attached via its second end region for movement pivotably about a pivoting axle on the first end region of the coupling link, and the second pivoting link being mounted via its first end region via a third pivoting bearing operably mounted to the tailgate such that the second pivoting link can be moved pivotably about a third pivoting axle, and the second pivoting link being attached via its second end region via a pivoting axle to the attachment region of the coupling link such that the second pivoting link can pivot relative to the coupling link.

9. The flow guiding apparatus according to claim 8, wherein a spoiler pivot point is situated on the coupling link of the first adjustment kinematics system.

10. A flow guiding apparatus of a motor vehicle, comprising a spoiler which is fastened to a tailgate of the motor vehicle, and an adjustment kinematics device for adjusting the spoiler between a rest position, in which the spoiler is arranged in a flush-mounted manner in the tailgate, and at least one functional position, in which the spoiler is deployed beyond a vehicle contour or a surface of the tailgate with regard to a height and/or an angle, in order to achieve a downforce effect and/or braking effect and/or aerodynamic improvement during driving of the motor vehicle, the adjustment kinematics device comprising a first adjustment kinematics system and a second adjustment kinematics system operably coupled to the first adjustment kinematics system, the first adjustment kinematics system being configured as a four-bar linkage and to set a deployment height, and the second adjustment kinematics system being configured as a four-bar linkage and to set a deployment angle, the first adjustment kinematics system being pivotable via a first electric motor arranged to pivot a first adjustment pivoting axle operably supported by the tailgate, and the second adjustment kinematics system being pivotable via a second electric motor arranged to pivot a second adjustment pivoting axle operably supported by the tailgate, and in that the second adjustment kinematics system has a double crank with a first double crank link with a first end region and a second end region and a second double crank link with a first end region and a second end region and a drop arm element with a first end region and an attachment region, the first double crank link being attached via its second end region to the first end region of the second double crank link such that the first double crank link and the second double crank link can pivot relative to one another, and the first double crank link being operably mounted by its first end region via the second adjustment pivoting axle to the tailgate, and the second double crank link being mounted via its second end region to the first end region of the drop arm element such that the second double crank link and the drop arm element can pivot relative to one another, and the drop arm element being attached fixedly via its attachment region on a lower side of the spoiler.

11. The flow guiding apparatus according to claim 10, wherein the first adjustment kinematics system has a first pivoting link with a first end region and a second end region, a coupling link with a first end region, a second end region and an intermediate attachment region, and a second pivoting link with a first end region and a second end region, the first pivoting link being mounted on its first end region via the first adjustment pivoting axle such that it can be moved pivotably about the first adjustment pivoting axle, the first pivoting link being attached via its second end region for movement pivotably about a pivoting axle on the first end region of the coupling link, and the second pivoting link being operably mounted via its first end region to the tailgate by a third pivoting axle such that the second pivoting link can be moved pivotably about the third pivoting axle, and the second pivoting link being attached via its second end region via a fourth pivoting axle to the attachment region of the coupling link such that the second pivoting link can pivot relative to the coupling link.

12. The flow guiding apparatus according to claim 11, wherein a spoiler pivot point is situated on the coupling link of the first adjustment kinematics system.

\* \* \* \* \*